United States Patent

Vosahlova et al.

[15] 3,644,114
[45] Feb. 22, 1972

[54] METHOD FOR LEACHING REDUCED LATERITE ORES

[72] Inventors: Eva A. Vosahlova, Edmonton; Donald Robert Weir, Fort Saskatchewan, Alberta, both of Canada

[73] Assignee: Sherritt Gordon Mines Limited, Toronto, Ontario, Canada

[22] Filed: Jan. 26, 1970

[21] Appl. No.: 5,658

[52] U.S. Cl. ................................. 75/101, 75/108, 75/119, 75/103
[51] Int. Cl. ....................................... C22b 23/04
[58] Field of Search ...................... 75/101, 119, 103, 82, 7

[56] References Cited

UNITED STATES PATENTS

| | | | |
|---|---|---|---|
| 1,487,145 | 3/1924 | Caron | 75/119 |
| 3,141,765 | 7/1964 | Brown et al. | 75/103 |
| 2,400,115 | 5/1946 | Hills et al. | 75/82 |
| 2,616,781 | 11/1952 | Forward | 75/119 X |

*Primary Examiner*—L. Dewayne Rutledge
*Assistant Examiner*—G. T. Ozaki
*Attorney*—Frank I. Piper and Arne I. Fors

[57] ABSTRACT

Reduction roasted laterite ore is leached in ammoniacal ammonium carbonate solution under oxidizing conditions. The first stage leach is prolonged for a period of time beyond that required to obtain maximum extraction of nickel and cobalt values from the reduced ore and is then terminated after the dissolved magnesium content of the leach solution reaches a constant low value. As a result of this procedure, more magnesium contamination precipitates on the leach solids as an insoluble compound. The resulting low-magnesium content of the leach solution, together with a novel cooling scheme in which the leach feed slurry is cooled to below 115° F. prior to the first stage leach, obviates the heretofore serious problem of magnesium scale development in leach solution recycle lines.

7 Claims, 3 Drawing Figures

3,644,114

METHOD FOR LEACHING REDUCED LATERITE ORES

This invention relates to improvements in the processing of laterite ore for the recovery of nickel and cobalt. More specifically, it is concerned with an improved process involving reduction roasting, quenching and leaching of the ore to place nickel and cobalt values contained in the ore into solution.

Laterite ore is a low-grade source of nickel and cobalt; it exists in deposits which have been found in a number of tropical countries such as Cuba, Guatemala and the Philippines. These deposits usually include distinct and separate layers of oxidized minerals known as limonite, serpentine and garnierite.

A number of hydrometallurgical processes for treating laterite ore to recover nickel and cobalt have been developed. Some of these processes involve treating the raw ore to make the nickel and cobalt leachable, leaching the ore to selectively dissolve nickel and cobalt, and recovering the nickel and cobalt in useful form from the leach solution.

The present invention is concerned with improving the "front end" of one such process. This process is known to those familiar with the art as the Nicaro process. It was invented by M. H. Caron, found commercial application in the Nicaro operations in Cuba and has been described in numerous patents and publications, e.g., U.S. Pat. No. 1,487,145.

In broad terms, the front end of the Nicaro process involves the following: Laterite ore is ground, dried and reduction roasted in a multiple hearth furnace to convert the nickel and cobalt oxide values in the ore to a leachable crude metal state. The hot calcine is cooled, then quenched in recycled ammoniacal ammonium carbonate leach solution. Quenching is conducted so as to produce a slurry having a temperature of about 115° F. This is the temperature at which leaching is carried out. The slurry from the quench step is then pumped into a leaching tank. Air is sparged into the slurry to create oxidizing conditions and leaching of the nickel values takes place. The leach reaction is exothermic; therefore the temperature of the slurry will increase slightly while the nickel goes into solution as nickel ammine carbonate. Leaching is terminated before a large proportion of the cobalt in the ore goes into solution. This procedure is followed to minimize cobalt contamination of the end product. Following leaching, the slurry is pumped into a thickener. Part of the thickener overflow, comprising clarified leach solution, is recycled to the quench step. This recycle stream is cooled prior to reaching the quench tank. The extent of cooling is controlled to ensure that the hot calcine and the recycle stream combine to give a slurry at leach temperature. In practice, it is found that the recycle stream must be cooled from about 115° F. (its exit temperature from the thickener) to about 87° F. in order to meet the aforesaid requirement.

Now, the present invention is concerned with two problems inherent in the above-described process. Firstly, during the leach operation, a substantial amount of the magnesium in the ore goes into solution. Part of this dissolved magnesium precipitates back out of solution during the recycling operation. This precipitate forms a scale on the piping. The situation is serious enough to require double piping between the thickener and quench tank so that one set of piping can be cleaned out while the other is in use. Secondly, cooling of the recycle stream is an inefficient procedure because laterite ore, and thus plants utilizing the process, are normally located in tropical areas and the water available for cooling is quite warm (about 85° F.). This means the desired temperature of the cooled recycle stream (about 87° F.) is close to the temperature of the cooling water; very large amounts of cooling water are therefore required to properly carry out the cooling operation.

We found that the magnesium present in the reduced ore dissolves quickly in the ammoniacal ammonium carbonate solution during the first few minutes of leaching and, further that the greatest part of this dissolved magnesium precipitates back out of solution if leaching is prolonged for a period of time beyond that required for the extraction of nickel. Surprisingly, almost all of this magnesium precipitate deposits in compound form on the suspended slurry solids where it remains in a harmless state. Deposition of magnesium scale on the walls of the processing vessels and piping is thereby substantially prevented. To summarize this aspect of the invention, the problem of magnesium scaling in the recycle lines has existed for quite some time. The relationship between leaching time and magnesium removal from solution was never established. We have found that, if the leaching operation is prolonged for a period of time sufficient to precipitate the greatest part of the dissolved magnesium from solution, while dissolving the nickel and the greatest part of the cobalt present in the reduced ore, magnesium precipitation on process equipment is greatly decreased. The bulk of extracted magnesium is associated with the leach end residue and rendered harmless.

In accordance with one feature of this invention, therefore, leaching is prolonged for a period of time beyond that required to obtain maximum extraction of nickel and cobalt values and is then terminated when the greatest part of the dissolved magnesium which is solubilized during the early stages of leaching has precipitated from solution in compound form on the leach slurry solids.

In accordance with another feature of the invention, a novel arrangement of modified treatment steps is provided. More specifically, laterite ore is roasted in accordance with the prior art to produce a calcine having a temperature of about 1,300° F. The hot calcine is partially cooled in an ore cooler and is then quenched in recycle ammoniacal ammonium carbonate leach-end solution so as to produce a quench slurry at comparatively elevated temperature, e.g., 132° F. The quenched slurry is then cooled, either before, during or both before and during leaching, to ensure that the temperature of the slurry during leaching remains below about 115° F. Following leaching, the slurry is thickened. At least part of the overflow is recycled directly back to the quench step without being cooled en route.

By the practice of the foregoing procedure, cooling of the recycle stream, as it moves between the thickener and quench tank, is eliminated. This means that changes in the solubility of the magnesium in this stream do not occur. As a result, magnesium in the recycle stream does not precipitate on the piping.

Since the temperature of the recycle stream, as it enters the quench tank, is still about 115° F., the temperature of the slurry leaving the quench tank will also be quite high. The cooling operation is applied to this relatively hot slurry from the quench tank. Since the slurry is at an elevated temperature (above 115° F.) and need be cooled down only to about 110° F. for leaching purposes, it will be appreciated that efficient cooling, using water at temperatures such as 85° F., can be readily achieved. In fact, the slurry temperature can even easily be lowered to about 105°–110° F. with 85° F. cooling water. As a result, the leaching step can be carried out at slightly lower temperatures than was the case in the prior art. This has the effect of reducing ammonia and carbon dioxide losses from the leach solution.

The invention is described in more detail hereinbelow with reference to the drawings in which.

Figure 1:
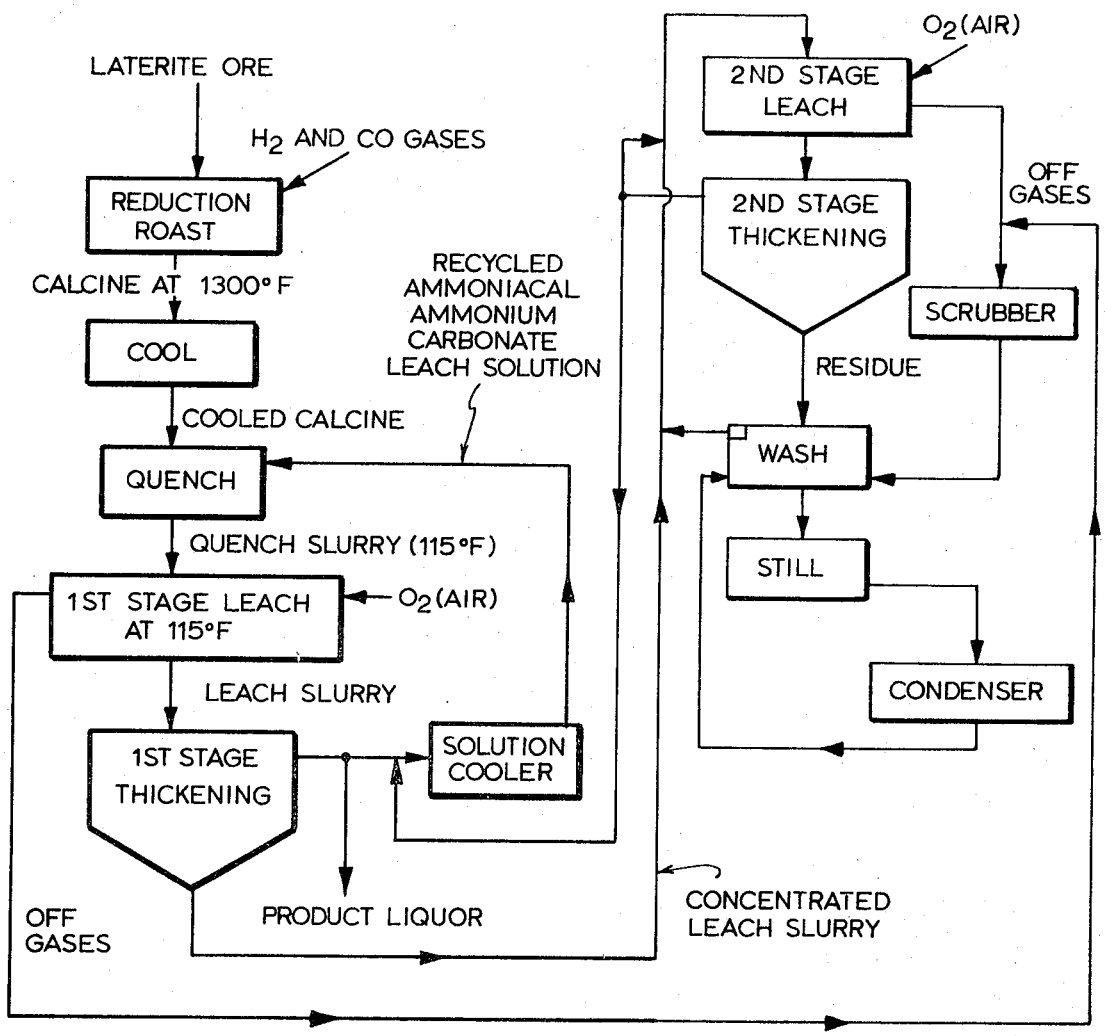
FIG. 1 is a flow sheet showing an overall roasting-leaching circuit in accordance with the prior art.

The known roasting-leaching circuit, shown in FIG. 1 involves reduction roasting, ore cooling, quenching, two stage leaching and thickening, and recovery and recycling of ammonia and carbon dioxide. Leach solution from the thickeners is recycled to the quench step. The recycle streams from the thickeners are cooled to an extent sufficient to ensure that the slurry leaving the quench tank is at 115° F. or less. Also, the length of the first stage leach is limited to avoid dissolving substantial quantities of cobalt.

Figure 2:
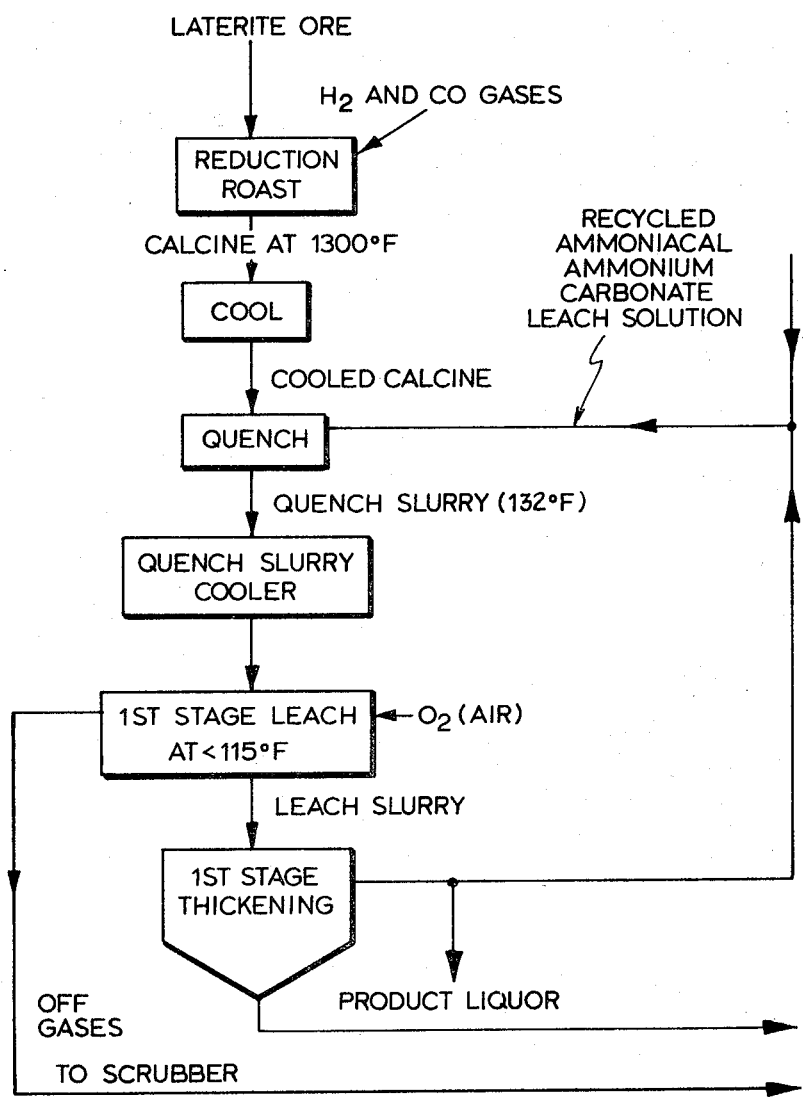
FIG. 2 is a simplified flow sheet showing the operational sequences in the present invention; in practice, the process of FIG. 2 is substituted for the portion of the circuit shown in heavy lines in FIG. 1.

In the modified scheme shown in FIG. 2, the ore is also roasted and cooled in accordance with conventional practice. Usually the calcine leaving the roaster is at 1,300° F. It is cooled in an ore cooler to about 410° F. and then quenched in recycle solution. However, the recycle leach solution used for quenching is supplied directly from the thickeners and is at a temperature of about 115° F. Material balances requires that about 2-3 pounds of ore are quenched in each gallon of recycled solution. Under these circumstances, the quenched slurry has a temperature (e.g., 132° F.) substantially higher than that known from prior art. Following quenching, the slurry is cooled, as in a water-cooled heat exchanger, to reduce its temperature to about 105-110° F. At this point, the slurry is ready for the first stage leach.

Leaching involves passing the slurry into a leach tank. Oxygen-bearing gas, such as air, is sparged through the tank throughout the leach. The leaching operation is prolonged for a sufficiently long period of time beyond that required for substantially complete nickel extraction to enable the greatest part of the magnesium in solution to precipitate onto the slurry solids and, in addition, to permit the major portion of the cobalt values in the ore to be solubilized. Leaching is terminated when precipitation of magnesium has substantially ceased. During leaching, the temperature of the slurry rises slowly due to the exothermic nature of the reaction. It is found that the leach will usually be complete before the temperature of the slurry reaches 115° F. However, it may be necessary to cool it by passing cooling water through coils provided in the leach tank. In any case, it is preferred that the leach temperature be maintained below 115° F. otherwise ammonia and carbon dioxide losses are excessive.

It will be appreciated that cooling could be carried out as a step between the quench and leach steps; alternatively, it could be carried out in conjunction with the leaching step, as by cooling with coils in the leach tank; or, a combination of both these approaches could be used. All three schemes are considered within the scope of the invention.

Following the first stage leach, the slurry is passed to a thickener. Part of the thickener overflow solution, is, as described above, recycled to join the stream from the second stage leach thickener. The combined streams are fed to the quench tank. The product liquor containing dissolved nickel and cobalt values can be treated in accordance with known procedures, such as described in Canadian Pat. No. 811,079 for example, for recovery of the nickel and cobalt values.

The following example shows the variation in solution magnesium content which takes place during the prolonged leaching operation. The steps, techniques and equipment used in roasting are known to those familiar with the art and form no part of the present invention. However, for the sake of clarity, the specific conditions employed in the preparation of the reduced calcine samples are briefly outlined in the example:

Samples of reduced ore were prepared from limonite, serpentine and 70/30 blends of limonite and serpentine ores. The limonite are contained (percent by weight) 1.3% Ni, 0.12% Co, 47% Fe and 2.0% Mg; the serpentine ore contained 1.4% Ni, 0.04% Co, 15% Fe and 16% Mg. Samples of ore which had been dried to a free moisture content of less than 5 percent by weight and ground to 90 percent minus 200 Tyler mesh size were roasted in a 12 hearth multiple hearth furnace. The top four hearths of the furnace were heated by direct, complete combustion of bunker "C" fuel. The ore temperature was raised to about 650-700° F. as it passed through these upper hearths. Reduction took place in the bottom eight hearths using the combustion products from partially combusted bunker "C" oil enriched with hydrogen. The temperature in the lower hearths was maintained at about 1,300° F. The atmosphere within the furnace was controlled in accordance with the following:

2.5 standard cubic feet of reductant per pound of ore
A $CO/CO_2$ ratio of 1/1
A $H_2/H_2O$ ratio of 2/1

Following roasting, samples of the calcine, which was discharged at 1,200° F., were cooled to about 140° F. in an ore cooler and quenched in water. (In practice, the cooled calcine would be quenched by dumping it into recycle leach solution. This recycle solution analyzes, for example, Ni-10 g.p.l., Co-2 g.p.l., Mg-0.06 g.p.l., $NH_3$-80 g.p.l. and $CO_2$-45 g.p.l.)

The quenched calcine samples were separately leached in the laboratory in aqueous ammoniacal ammonium carbonate solution at 20 percent solids. The leach solution contained ammonia and carbon dioxide as shown in the Table. In three cases, the solution also contained some nickel.

Figure 3:
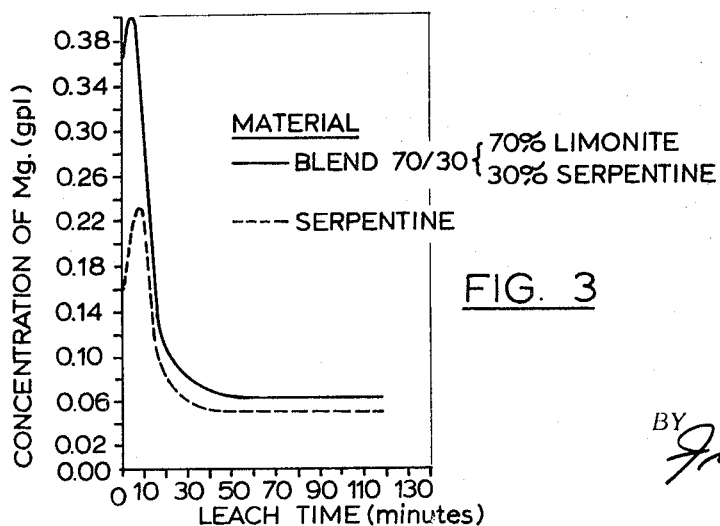
FIG. 3 is a curve showing the variation of magnesium content in solution with time during leaching.

Each slurry was maintained at 110° F., agitated and oxygen gas was bubbled into the slurry at 2 litres per minute for 3 hours. Samples of leach solution were drawn off at regular intervals throughout the operation. These samples were analyzed for magnesium content. The results are recorded in the Table and in FIG. 3.

It will be noted that the magnesium content reached its maximum value in about 5-10 minutes, then dropped off to a constant value after about 30 minutes and continued leaching had no beneficial effect on further lowering the magnesium content of the solution.

It will be appreciated, therefore, that maximum nickel and cobalt extractions and removal of magnesium contamination can be achieved with minimum retention time in the leaching operation by prolonging the leaching for a period of time, e.g., in the order of 30 minutes, and terminating the leach when the precipitation of dissolved magnesium has substantially ceased, i.e., when the magnesium in solution has reached a constant low value, e.g., about 0.05 g.p.l.

TABLE

[Conditions of leaching: Temperature 43° C. (110° F.); Flow of $O_2$: 2 litres per minute; Leach time: 3 hours; Solids content: 20% be weight]

| Type of roasted laterite ore | Percent mg. in unreduced material | Composition of leach liquor (g.p.l.) at zero time | | | G.p.l. mg. in solution after— | | | |
|---|---|---|---|---|---|---|---|---|
| | | Ni | $NH_3$ | $CO_2$ | 5 min. | 30 min. | 60 min. | 180 min. |
| Limonite | 2.52 | 0 | 87.6 | 49.7 | 0.10 | 0.1 | 0.10 | 0.07 |
| Blend 70/30 [1] | 7.88 | 0 | 77.0 | 44.6 | 0.16 | 0.04 | 0.06 | 0.08 |
| | 7.88 | 0 | 81.9 | 57.8 | 0.24 | 0.08 | 0.06 | 0.08 |
| | 7.88 | 11.35 | 81.5 | 56.5 | 0.19 | 0.10 | 0.06 | 0.08 |
| | 7.88 | 8.0 | 80 | 50.0 | .20 | 0.05 | 0.03 | 0.05 |
| Serpentine | 16.7 | 0 | 80 | 50.0 | 0.40 | 0.08 | 0.06 | 0.06 |

[1] 70 weight percent limonite, 30 weight percent serpentine.

What we claim as new and desire to protect by Letters Patent of the United States is:

1. In a method for extracting nickel and cobalt values from laterite ore containing magnesium wherein the ore is roasted under reducing conditions to convert the nickel and cobalt to a crude metal state, the resulting calcine is quenched in ammoniacal ammonium carbonate solution then leached in at least one stage under oxidizing conditions to effect extraction of nickel and cobalt values therefrom, the slurry from a first said leach stage is passed to a thickener and solution from the thickener is recycled to provide at least part of the quench solution, the improvement which comprises: prolonging the first leach stage for a period of time sufficient to ensure that the greatest part of the magnesium, previously solubilized during the early period of leaching when maximum extraction occurs of nickel and cobalt values from quenched calcine subjected to said first stage leach, precipitates in compound form on the leach slurry solids; and terminating said first stage of leaching as soon as said greatest part of magnesium has precipitated.

2. The method according to claim 1 which includes the step of removing heat from the quench slurry by cooling to ensure that the temperature of the slurry during leaching remains below about 115° F.

3. The method according to claim 1 wherein the leaching is terminated when the dissolved magnesium content is lowered to about 0.05 grams per litre.

4. The method of claim 3 wherein the quench slurry is cooled before the leaching step to a temperature within the range of 105°–110° F.

5. The method of claim 3 wherein the quench slurry is cooled before the leaching step to ensure that the temperature during the leaching step is less than about 110° F.

6. The method of claim 3 wherein the quench slurry is cooled during the leaching step to ensure that its temperature during the leaching step is less than about 110° F.

7. The method of claim 3 wherein the quench slurry is cooled both before and during the leaching steps to ensure that its temperature during the leaching step is less than about 110° F.

* * * * *